US010523820B2

(12) United States Patent
Garrido et al.

(10) Patent No.: US 10,523,820 B2
(45) Date of Patent: Dec. 31, 2019

(54) HIGH-QUALITY AUDIO/VISUAL CONFERENCING

(71) Applicant: Apple Inc., Cupertino, CA (US)

(72) Inventors: Christopher M. Garrido, San Jose, CA (US); Eric L. Chien, Santa Clara, CA (US); Wenhui Xu, Sunnyvale, CA (US); Xiaoxiao Zheng, Santa Clara, CA (US); Spencer E. Lewson, Mountain View, CA (US); Keith W. Rauenbuehler, San Francisco, CA (US); Komei Harada, Fremont, CA (US); Ming Jin, Saratoga, CA (US); Gurtej Singh G. Chandok, Sunnyvale, CA (US); David L. Biderman, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 15/991,905

(22) Filed: May 29, 2018

(65) Prior Publication Data
US 2018/0352089 A1 Dec. 6, 2018

Related U.S. Application Data

(60) Provisional application No. 62/514,729, filed on Jun. 2, 2017, provisional application No. 62/566,011, filed on Sep. 29, 2017.

(51) Int. Cl.
*H04M 3/56* (2006.01)
*H04N 7/14* (2006.01)
(Continued)

(52) U.S. Cl.
CPC ........ *H04M 3/567* (2013.01); *H04L 65/1083* (2013.01); *H04L 65/403* (2013.01);
(Continued)

(58) Field of Classification Search
CPC ............. H04L 65/1083; H04L 65/4023; H04L 65/403; H04M 3/567; H04N 5/23235; H04N 7/147; H04N 7/155
See application file for complete search history.

(56) References Cited

U.S. PATENT DOCUMENTS 6,385,392 B1 * 5/2002 Makita ................ G06F 11/1076
360/55
7,404,001 B2 7/2008 Campbell
(Continued)

*Primary Examiner* — Stephen J Clawson
(74) *Attorney, Agent, or Firm* — Blank Rome LLP

(57) ABSTRACT

A first request to form a conference call is received from a first of a plurality of electronic devices. In response to the first request, a conference data structure is generated in a memory. Based on determining the conference call has ended, a second request is transmitted to each of the plurality of electronic devices to return a high-resolution video stream generated by each electronic device during the conference call. In response to the second requests, the high-resolution video stream is received from at least some of the plurality of electronic devices. Each of the received high-resolution video streams is stored in the conference data structure in the memory to generate a completed conference data structure. A notice that the completed conference data structure is available is transmitted to each of the plurality of electronic devices.

20 Claims, 9 Drawing Sheets

(51) Int. Cl.
 H04L 29/06 (2006.01)
 H04N 5/232 (2006.01)
 H04N 7/15 (2006.01)

(52) U.S. Cl.
 CPC ..... H04L 65/4023 (2013.01); H04N 5/23235 (2013.01); H04N 7/147 (2013.01); H04N 7/155 (2013.01)

(56) References Cited

U.S. PATENT DOCUMENTS

| | | | |
|---|---|---|---|
| 8,244,816 B2 * | 8/2012 | Pinding | H04L 67/24 709/204 |
| 8,319,817 B2 | 11/2012 | Roo | |
| 8,380,790 B2 | 2/2013 | Lee | |
| 9,167,203 B2 | 10/2015 | Cho | |
| 9,300,910 B2 * | 3/2016 | Shoemake | H04N 7/147 |
| 9,386,275 B2 | 7/2016 | Oyman | |
| 9,516,220 B2 | 12/2016 | Oyman | |
| 9,516,267 B2 | 12/2016 | Wang | |
| 9,531,999 B2 | 12/2016 | Shi | |
| 10,169,824 B2 * | 1/2019 | Beavers | G06Q 10/10 |
| 10,182,204 B1 * | 1/2019 | Taine | H04N 7/147 |
| 2002/0107969 A1 * | 8/2002 | Waldvogel | H04L 12/1881 709/231 |
| 2007/0024706 A1 | 2/2007 | Brannon, Jr. | |
| 2010/0066804 A1 * | 3/2010 | Shoemake | H04N 7/147 348/14.02 |
| 2010/0149301 A1 | 6/2010 | Lee | |
| 2012/0078906 A1 * | 3/2012 | Anand | G06Q 10/06 707/737 |
| 2013/0339996 A1 * | 12/2013 | Davis | H04M 1/72533 725/31 |
| 2014/0210939 A1 * | 7/2014 | Mock | H04N 7/152 348/14.03 |
| 2014/0269932 A1 * | 9/2014 | Su | H04N 21/234372 375/240.25 |
| 2015/0187389 A1 * | 7/2015 | Horita | G11B 27/036 386/264 |
| 2015/0241939 A1 * | 8/2015 | Im | G06F 1/3265 715/867 |
| 2015/0304717 A1 * | 10/2015 | Kim | G06Q 30/0269 725/59 |
| 2017/0324785 A1 * | 11/2017 | Taine | H04L 65/1069 |

* cited by examiner

HIGH-QUALITY AUDIO/VISUAL CONFERENCING

BACKGROUND

This disclosure relates generally to audio/visual conferencing. More particularly, but not by way of limitation, this disclosure relates to techniques for the on-demand capture of high-quality images during audio/visual conferencing.

Video or audio/visual conferencing using, for example, smart phones provides a means for parties to both see and hear one another during a call. While a party's smart phone may be able to capture high-resolution images, the quality or resolution of those images are reduced during the encoding process so that only low-resolution images are transmitted to the receiving party. Thus, if the receiving party wants to capture an image of the transmitting party, the only image they have access to is a low-resolution image (such as can be obtained through a screen capture operation).

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment the disclosed concepts provide an audio/visual conferencing method to generate a conference data structure that captures high-resolution audio/video streams from each call participant. In one example, the method includes receiving, from a first of a plurality of electronic devices, a first request to form a conference call, and generating, in response to the first request, a conference data structure in a memory. The method also includes transmitting, based on determining the conference call has ended, a second request to each of the plurality of electronic devices to return a high-resolution video stream generated by each electronic device during the conference call (in one embodiment, high-resolution audio is also be requested from each device), and receiving, in response to the second requests, the high-resolution video stream from at least some of the plurality of electronic devices. The method further includes storing each of the received high-resolution video streams in the conference data structure in the memory to generate a completed conference data structure, and transmitting, to each of the plurality of electronic devices, a notice that the completed conference data structure is available. In one or more other embodiments, the various methods described herein may be embodied in computer executable program code and stored in a non-transitory storage device. In yet other embodiments, the methods may be implemented in an electronic device having mobile communications capabilities.

DETAILED DESCRIPTION

Figure 1:
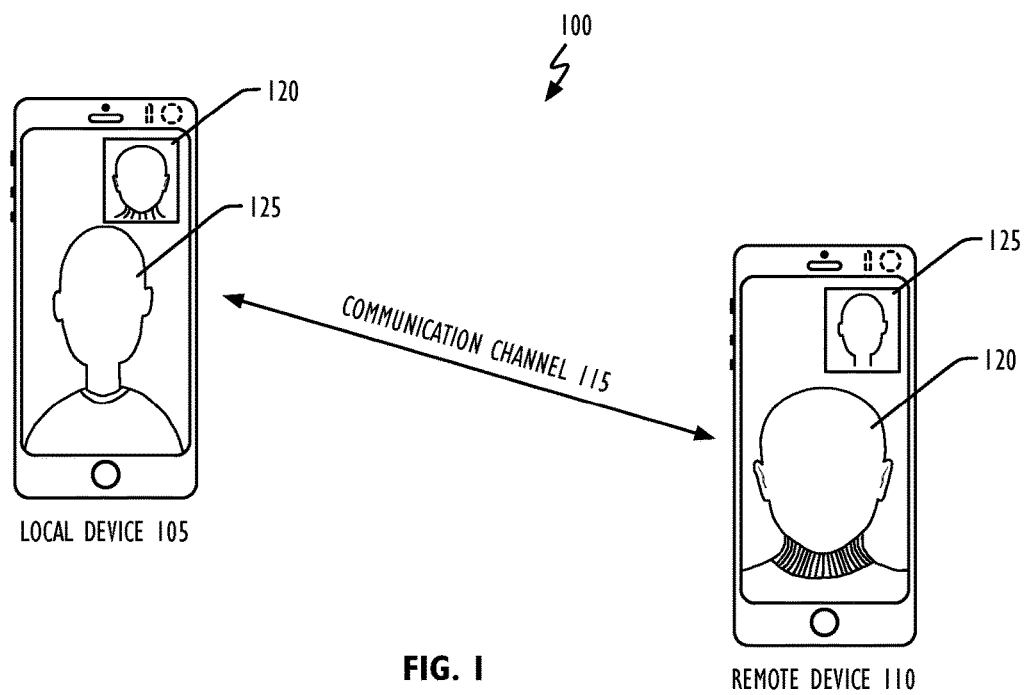
FIG. 1 shows, in block diagram form, a communication system in accordance with one or more embodiments.

This disclosure pertains to systems, methods, and computer readable media to improve the operation of an audio/visual (A/V) conference system. In general, techniques are disclosed for enabling one party to an A/V conference to designate, e.g., via selection of a low-resolution image displayed on their smart phone, an image of a second party for which they can receive a high-resolution or quality image. More particularly, techniques disclosed herein permit a party to identify a first (low-resolution) image as it is displayed on their smart phone (or tablet or other type of user device) during an A/V conference call. Identifying information specific to the first image is collected and a request for a high-resolution copy of the image sent to the party sourcing the transmitted image. In one or more embodiments, the high-resolution image is sent from the image's sourcing device to the requestor's device during, or after, the A/V call (e.g., depending on available bandwidth). In one or more other embodiments, the high-resolution image is sent from the image's sourcing device to the requestor's device through an alternate communication channel (e.g., via a chat or social media channel). In still other embodiments, the high-resolution image is sent from the image's sourcing device to a network-based service from which the requestor obtains the image. By way of example only, the network-based system could be a cloud-based storage or relay system. In yet other embodiments, a high-resolution video stream (with or without audio) is obtained by one party of another party.

In other embodiments, operation of an A/V conference system is improved by allowing one party to a conference call to designate a portion or region of an image received from another conference participant for additional remote processing. If the designated region is captured at a higher resolution (e.g., at 4K resolution) than the images transmitted between the participants (e.g., 720p resolution), the effect of embodiments of this type is to provide the party designating the region with a "blown-up" or "zoomed-in" image of the designated region. More particularly, techniques disclosed herein allow one party to an A/V conference call to designate a region of an image received from a second party to the conference call. Information identifying the designated region is sent to the party transmitting the image, after which that party's device (e.g., a smart phone) captures the image at high-resolution (if not already done), extracts that portion of the high-resolution image corresponding to the designated region, encodes the extracted region at a lower-resolution than it was captured at, and sends that to the first party. The effect of this operation is that the first party sees an image that appears to have been zoomed-in from the original image to that of the designated region.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of video and audio/visual conferencing systems having the benefit of this disclosure.

Referring to FIG. 1, communication system 100 in accordance with one or more embodiments includes local device 105 and remote device 110 that exchange information via communication channel 115. During use, communication channel 115 uses cellular technology, network technology or a combination of cellular and network technology. Cellular technology includes, but is not limited to, high-speed wireless communications operated in accordance with 4G or Long-Term Evolution (LTE) standards. Network technology may include wireless local area networks (WLANs) operated in accordance with the Institute of Electrical and Electronics Engineers (IEEE) 802.11 standards. In some embodiments of communication system 100, each party's mobile unit displays two images: one of the local device's user (e.g., local user 120) and one of the remote device's user (e.g., remote user 125). In FIG. 1, the terms "local user" and "remote user" are based on the perspective of local device 105. This perspective will be adhered to throughout this application. As such, even though a user of remote device 110 may consider themselves to be the local user of their device, for purposes of this application they will be referred to as a remote user.

Conventionally, during conference calls, if a party's device (e.g., smart phone) had the capability to generate high-resolution video (e.g., 4K) and audio (e.g., HD voice), that data could be stored locally in its high-resolution state. Audio and video received from other conference participants however is in a relatively lower-resolution form. For example, video is often transmitted in 720p format which is significantly lower-resolution than is 4K. Similarly, traditional telephony is based on sampling the audio stream 8,000 times a second and constrains reproduction of the sound spectrum to the range of 200 Hz to 3.3 KHz, while HD voice doubles the sampling rate to permit reproduction of the sound spectrum to the range of 50 Hz to 7 KHz. Thus, while a participant could generate high-resolution data for their portion of a video conference, they had access only to low-resolution data for those portions from other participants.

Figure 2:
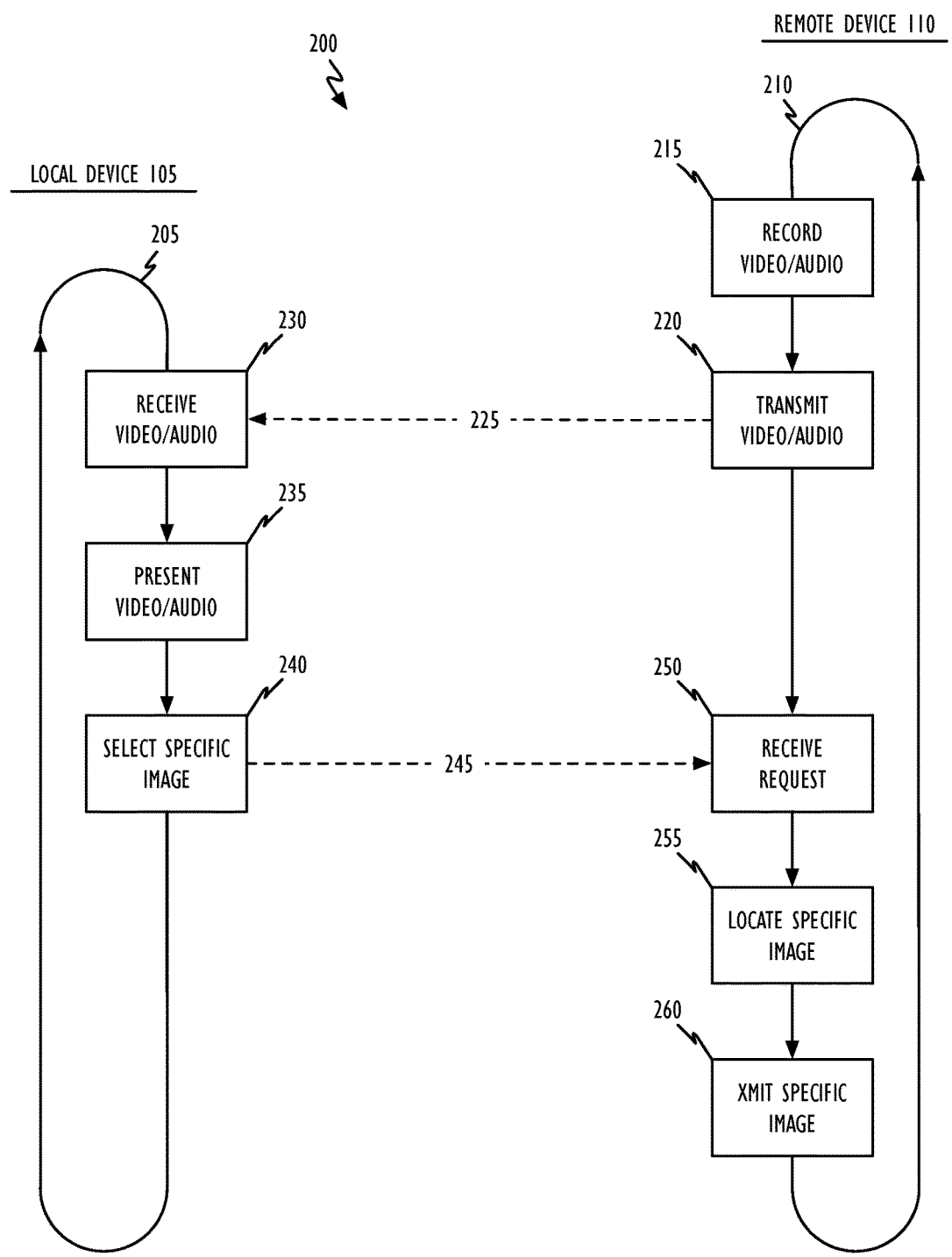
FIG. 2 shows, in block diagram form, a conferencing operation in accordance with one or more embodiments.

Referring to FIG. 2, conferencing operation 200 in accordance with one or more embodiments includes local transmission loop 205 (corresponding to local device 105) and remote transmission loop 210 (corresponding to remote device 110). As shown, remote device 110 records (block 215) and transmits (block 220)—via remote transmission loop 210—stream 225 to local device 105. In general, stream 225 includes a relatively low-resolution image sequence (e.g., compared to what remote device 110 captures) and a corresponding audio signal. In response, local device 105 receives (block 230)—via local transmission loop 205—and presents (block 235) stream 225. For example, the received video sequence may be displayed on the local device's display screen (not shown) and the audio signal played back via the local device's speakers (not shown). At some point during display of the received image sequence a user of local device 105 signals their desire to capture a high-quality version of a currently displayed low-resolution image (block 240). In some embodiments, selection is made through activation of a hardware switch, a displayed software switch, or a user's tap of the local device's display element if it supports touch input. Local device 105 then determines identifying information for the image displayed at the time the selection was made (e.g., a timestamp or image sequence number) and transmits—via local transmission loop 205—request 245 to remote device 110 for the identified image. In turn, remote device 110 receives (block 250)—via remote transmission loop 210—request 245, locates the specific identified image in, for example, a memory buffer (block 255) and transmits said image to local device 105 (block 260). In one embodiment, remote device 110 uses the identified image's timestamp or image sequence number to search its video buffer memory to locate the requested image's high-resolution counterpart. (It should be understood that as the events described in accordance with FIG. 2 occur, local device 105 is simultaneously recording and transmitting an A/V stream to remote device 110. For simplicity of discussion, this action has not been shown in FIG. 2.)

Figure 3A:
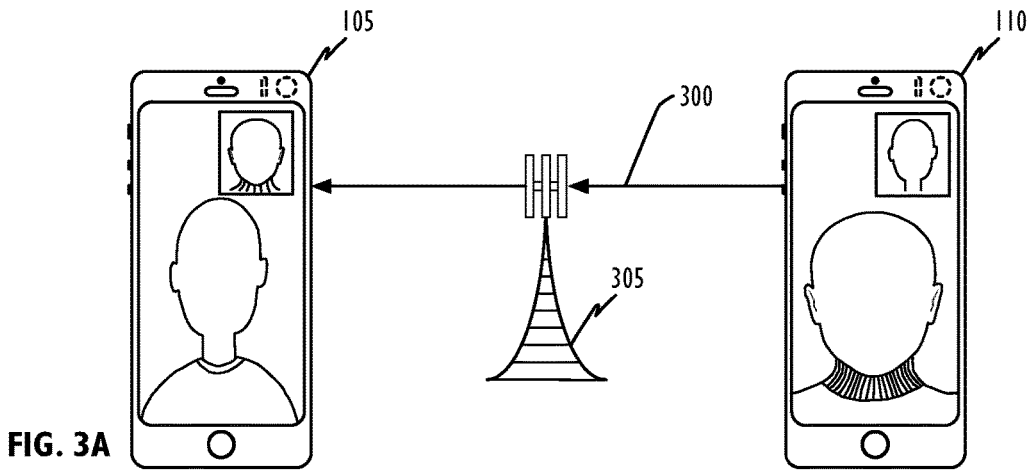
FIGS. 3A-3C show, in block diagram form, sample communication paths in accordance with various embodiments.
Figure 3B:
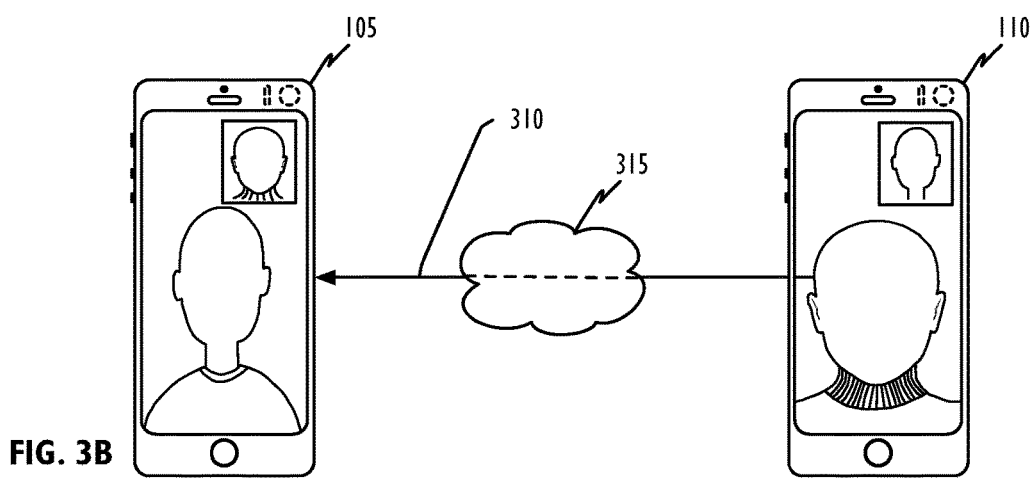
Figure 3C:
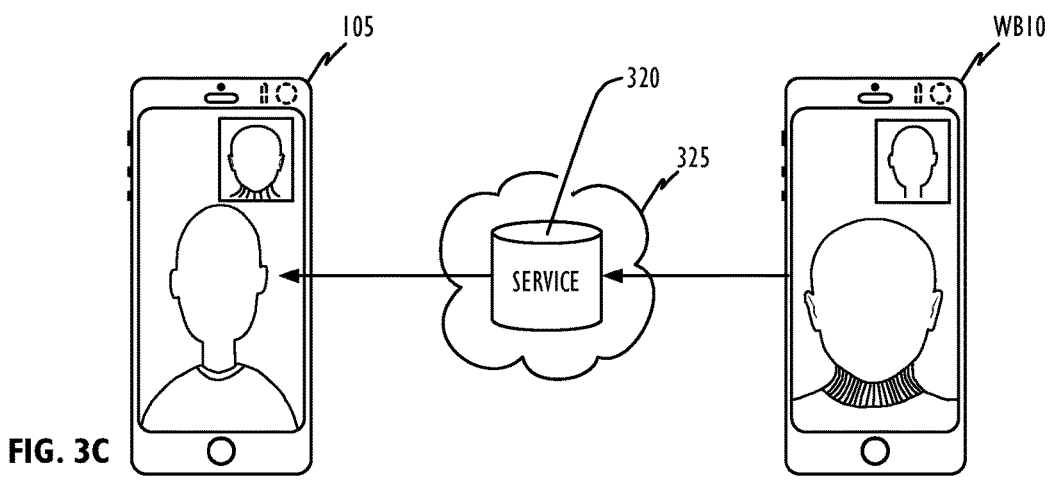

In one embodiment, remote device 110 transmits the requested high-resolution image to local device 105 via a communication channel other than remote transmission loop 210 (e.g., the A/V conference communication channel). Referring to FIG. 3A, in one embodiment remote device 110 transmits the requested high-resolution image to local device 105 by way of chat communication channel 300 over telephone network 305. Referring to FIG. 3B, in another embodiment remote device 110 transmits the requested high-resolution image to local device 105 by way of email communication channel 310 over network 315. Referring to FIG. 3C, in still another embodiment remote device 110 transmits the requested high-resolution image to local device 105 by way of network-based service 320 (resident in cloud 325). In one embodiment, network-based service 320 could be a social network. In another embodiment, network-based service 320 could be a data or information synchronization service. In still another embodiment, network-based service 320 could be an application service provider (ASP) that permits information storage and management. In the case remote device 110 does not directly transmit the high-resolution image to local device 105 (e.g., such as anticipated by FIG. 3C), remote device 110 issues a communication to local device 105 (e.g., an auto-generated email or text message) indicating that the video is waiting at a specified site for retrieval.

Figure 4:
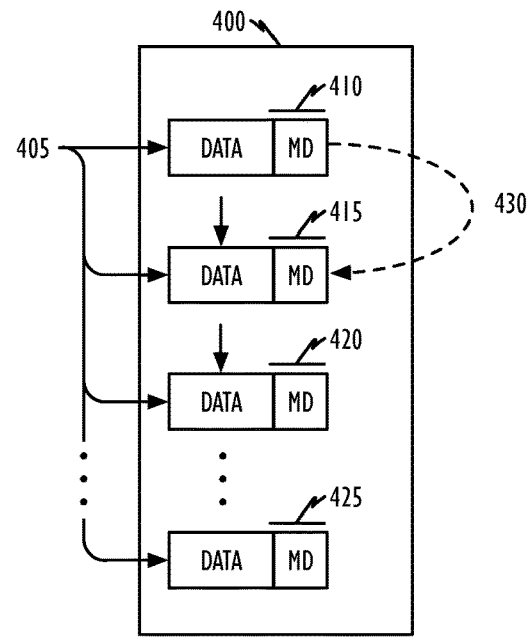
FIG. 4 shows, in block diagram form, a video memory in accordance with one or more embodiments.
Figure 5:
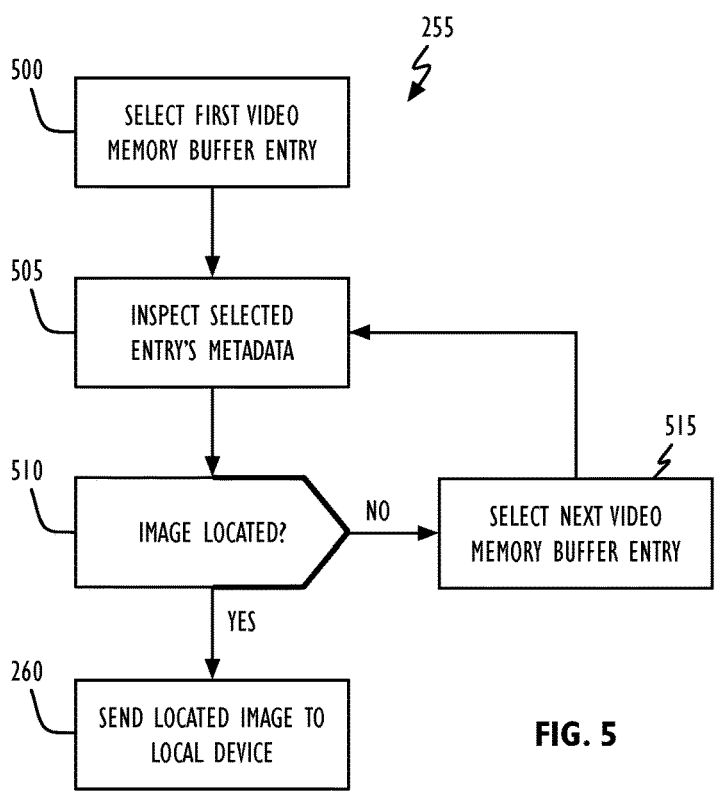
FIG. 5 shows, in flowchart form, an image location operation in accordance with one or more embodiments.

Image location operation 255 in accordance with one or more embodiments has remote device 110 inspect its video memory for the high-resolution counterpart to the low-resolution image identified on local device 105. Referring to FIG. 4, in one embodiment the remote device's video memory 400 is organized into a circular buffer, circular queue, cyclic buffer or a ring buffer as indicated by storage operations 405 (solid lines). Each element or entry (e.g., 410-425) can include high-resolution image data (denoted by "DATA") and metadata (denoted by "MD"). In one embodiment, audio data is also stored in video memory 400. In another embodiment, audio data is stored in a separate memory and "tied" or logically linked to the image sequence stored in video memory 400 through a series of links or identifiers (e.g., timestamps). Referring now to FIG. 5, in one embodiment image location operation 255 can begin with remote device 110 selecting a first video memory entry (block 500) such as, for example, entry 410 in FIG. 4. The selected entry's metadata is inspected (block 505); e.g., the "MD" portion of entry 410 in FIG. 4. If the selected image's metadata does not correspond with or include the image identification information received from local device 105 (the "NO" prong of block 510), a next video memory entry is selected (block 515), as indicated by dashed line 430 in FIG. 4, where after image location operation 255 continues at block 505. If inspection of the selected video memory entry's metadata corresponds with or includes the image identification information received from local device 105 (the "YES" prong of block 510), the identified image data and some or all of its corresponding metadata is sent to local device 105 (block 260). In some embodiments, operations in accordance with block 510 use image timestamp information to identify the proper high-resolution image. In other embodiments, a frame sequence identifier is used.

Figure 6:
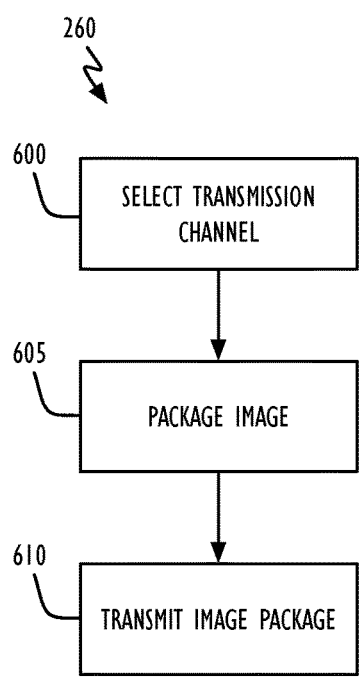
FIG. 6 shows, in flowchart form, data transmission operation in accordance with one or more embodiments.

Referring to FIG. 6, in one or more embodiments transmission of a high-resolution image in accordance with operation 260 first selects or determines an appropriate transmission channel (block 600). In one embodiment, high-resolution images are transmitted via chat, email or social media transmission channels. For example, the requester's email, chat or social media contact information is identified by an address book or other database lookup operation by remote device 110 (the database may be resident on remote device 110 or remote therefrom; e.g., a web-based address service). When such information is not available, remote device 110 queries local device 105 using in-band or out-of-band communications. Once a transmission channel has been selected, the high-resolution image may be "packaged" in accordance with that channel's protocol or other transmission rules (block 605) and then transmitted to local device 105 over the selected channel (block 610). If the requested image is sent to a network-based storage site (such as anticipated by FIG. 3C), remote device 110 issues a communication to local device 105 (e.g., an auto-generated email or text message) indicating that the image is waiting at a specified site for retrieval.

In another embodiment, rather than requesting a single high-resolution image a user of local device 105 requests a high-resolution video (e.g., sequence of images and associated audio). In one such embodiment, a user of local device 105 provides a first input to indicate the desired start time of a high-resolution video and another input to indicate the desired stop time. In some embodiments, if no "stop" signal is received at remote device 110, the A/V conference is recorded from the designated start time until the conference's end.

Figure 7:
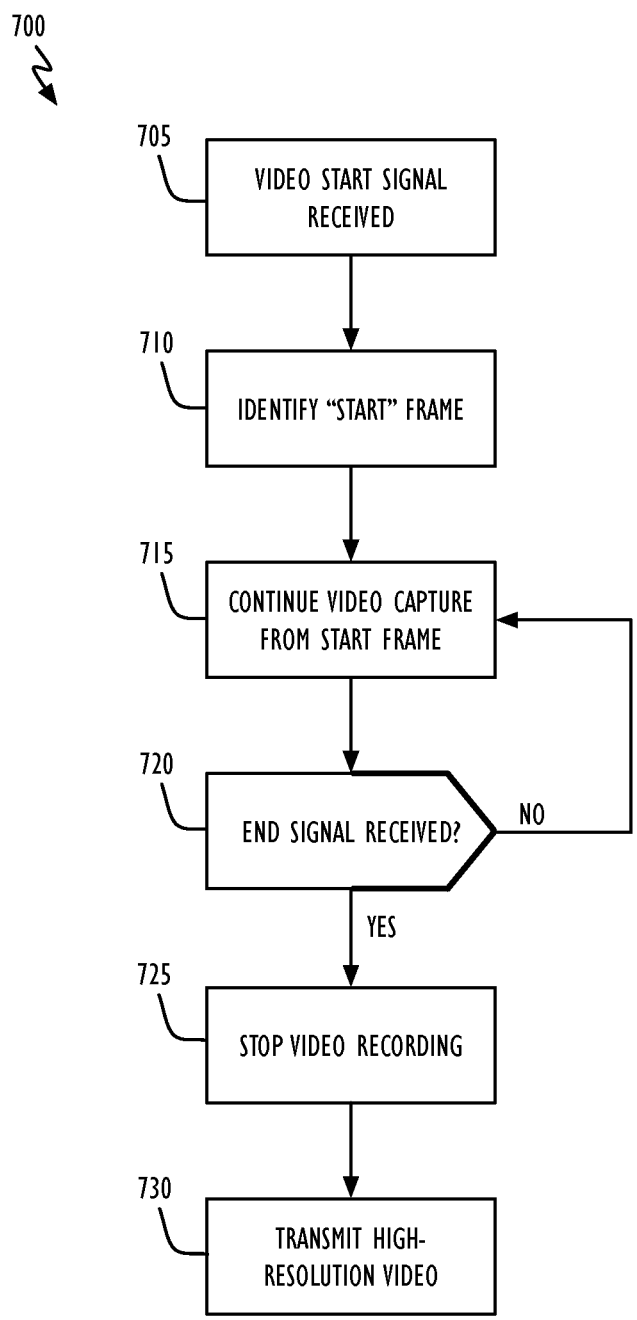
FIG. 7 shows, in block diagram form, a multi-function electronic device in accordance with one or more embodiments.

Referring to FIG. 7, remote video capture operation 700 in accordance with one or more embodiments may begin at remote device 110 when it receives a "start video" signal (block 705). Remote device 110 then identifies, in its video memory, the high-resolution counterpart to the low-resolution image displayed on local device 105 at the time the "start video" signal was generated (block 710). From the identified frame, high-resolution video is recorded (block 715) while waiting for an "end" signal (the "NO" prong of block 720). When an "end" signal is received from local device 105 (the "YES" prong of block 720), video recording is terminated (block 725), where after the recorded high-resolution video is transmitted (block 730). In one embodiment, the recorded high-resolution video is transmitted directly to local device 105 if remote device 110 determines there is sufficient bandwidth to do so (e.g., through out-of-band communication with local device 105). In another one or more embodiments, remote device 110 transmits the high-resolution video to a cloud- or network-based storage site (e.g., network-based service 320). Once the video has been sent to the network-based storage site, remote device 110 issues a communication to local device 105 (e.g., an auto-generated email or text message) indicating that the video is waiting at the specified site for retrieval.

Figure 8:
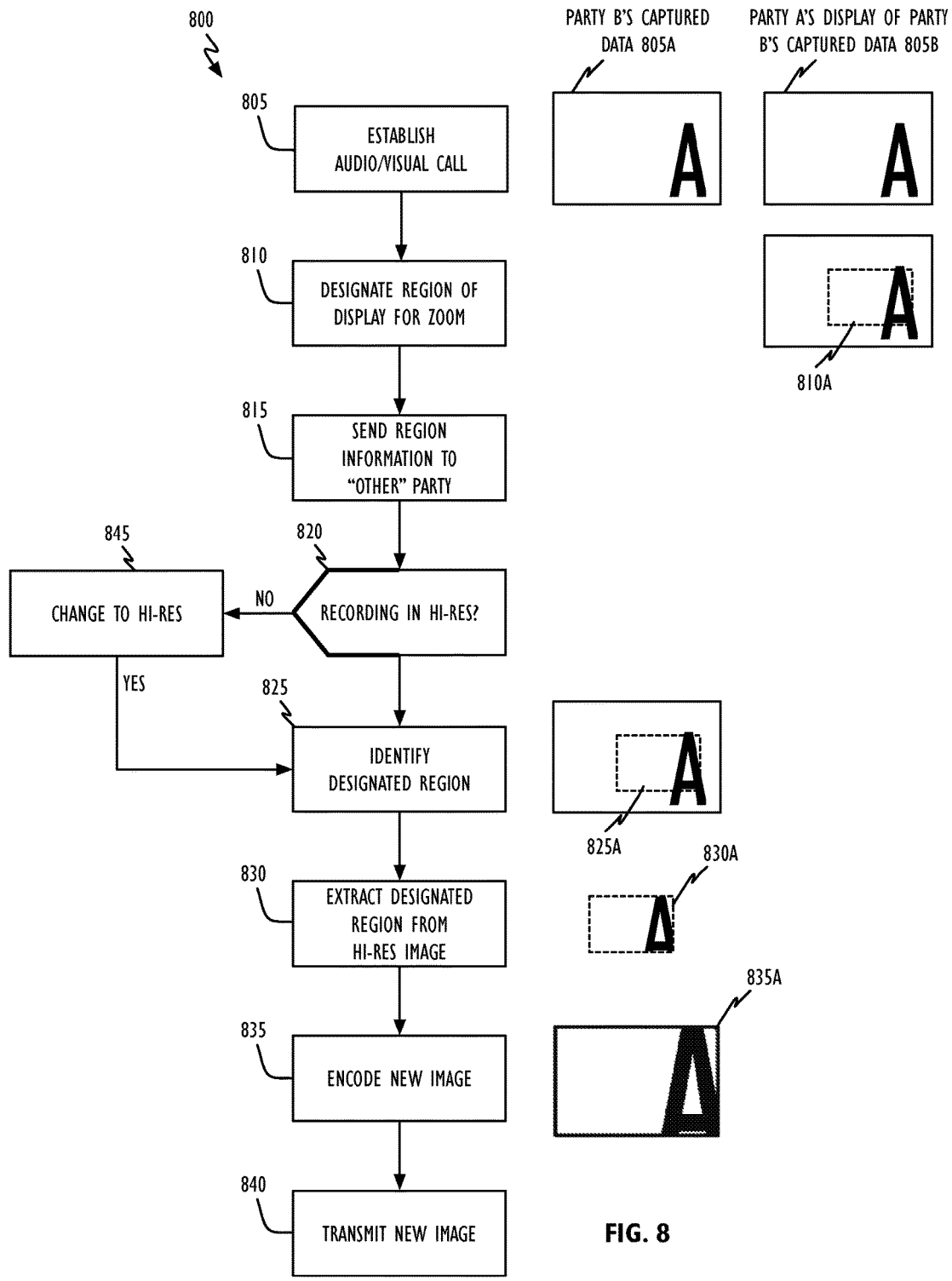
FIG. 8 shows, in flowchart form, an image capture operation in accordance with one or more embodiments.

In another one or more embodiments, a remote user controls the image capture region and possibly the resolution of another's electronic device. An electronic device could be, for example, a mobile telephone, personal media device, a notebook computer system, or a tablet computer system. Referring to FIG. 8, image capture operation 800 in accordance with this approach begins when at least two parties establish an A/V conference (block 805). For simplicity consider two parties, A and B, and focus on party B's captured data 805A as displayed on party A's display 805B. After call establishment, one of the parties (e.g., party A) designates region 810A of their display as a region they would like an image of (block 810). In one embodiment, a region is designated by a finger tap. For example, the finger tap could be used to designate a region of a predetermined size whose middle point coincides with the finger tap. In another embodiment, a region is designated by a finger touch followed by a drag motion, where the initial finger touch identifies the region's upper left (or right) corner and the drag motion terminates at the region's lower right (or left) corner. However designated, information identifying the designated region may be transmitted from party A's electronic device to party B's electronic device (block 815). By way of example, this information may be communicated as part of the information constituting the A/V conference. If the device receiving the area designation (e.g., party B's electronic device) is already recording in high-resolution (the "YES" prong of block 820), that portion of party B's currently captured image or frame corresponding with party A's designated region 810A (e.g., portion 825A) is identified (block 825), extracted to form or constitute new image 830A (block 830), and encoded (block 835) to generate zoom-in image 835A. Zoom-in image 835A can then be transmitted to party A directly or indirectly as discussed above through one or more cloud-based services (block 840). Returning to block 820, if party B's electronic device is not currently capturing high-resolution images (the "NO" prong of block 820), party B's electronic device's image capture system is switched to do so (block 845), where after operation 800 continues at block 825.

As a use-case example, consider party A and B communicating via FaceTime® wherein each device transmits to the other encoded 720p images (images that are 1280×720 pixels). (FACETIME is a registered trademark of Apple Inc.) At some point during the conference, party B changes their active camera from the front-facing to a rear-facing camera so that they can show party A some animals frolicking in a park. Party A decides they would like to see a zoomed-in view of one of the animals and makes a finger-tap on their display corresponding to the displayed animal. The identified region in the image is transmitted from party A's smart phone to party B's smart phone. Party B's device checks to see if the device is in high-resolution mode (e.g., 4K with approximately 4000×2000 pixels) and sees that it is. If Party B's device is not in the high-resolution mode, then the device may change to the high-resolution mode in accordance with FIG. 8, element 845. That portion of party B's captured image corresponding to the region designated by party A is identified and, while described above as being extracted to form a "new" image (block 830), this may not be necessary in practice. When the region captured in high-resolution 4K is encoded and into 720p format, the resulting image is effectively a blown-up or zoomed-in version of the designated region. This image is then transmitted to party A for either display or storage. It should be noted that technical details such as image buffering have been ignored in the above example for ease of presentation. It is noted however that because of transmission and display delays, the designated region of an image displayed on party A's display must correspond to a previously transmitted and buffered image at party B's device.

Figure 9:
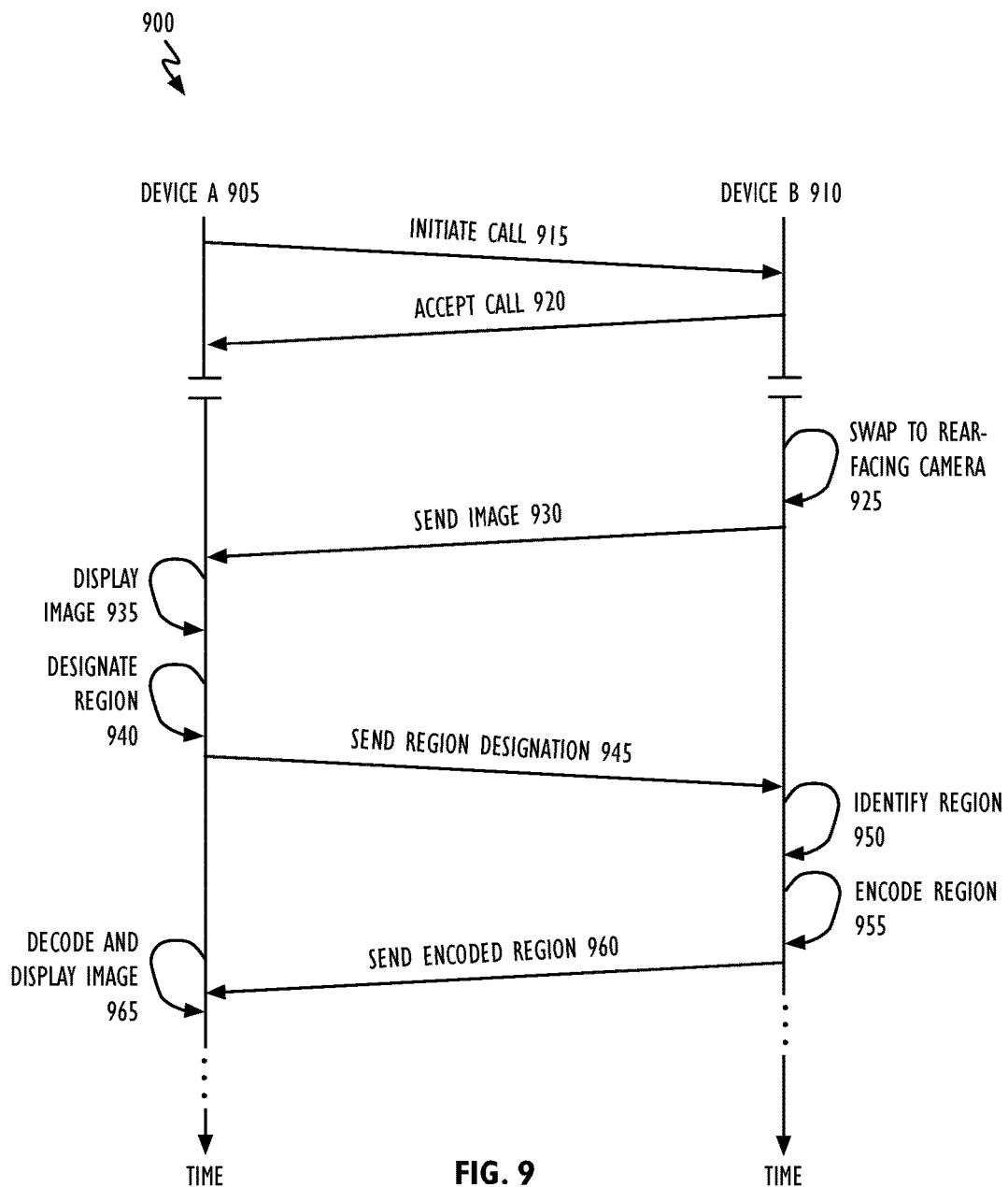
FIG. 9 shows another image capture operation in accordance with one or more embodiments.

To see this more clearly, consider FIG. 9 where communication operation 900 between party A 905 and B 910 is again shown. In this presentation, communication 900 is initiated by party A (915) and accepted by party B (920). After some time, party B activates their high-resolution (e.g., 4K) rear-facing camera (925) where after a high-resolution image is transmitted to party A (930). In some examples, this may include party B streaming a temporal sequence of images or video to party A. For purposes of this example however, we will focus on a single image. Once displayed (935), party A designates a portion, area or region of the image (940) in any convenient manner and sends this information to party B's device (945). Party B's device uses this information to identify the buffered image and region within that image corresponding to party A's designation (950). That portion of the captured high-resolution image is encoded (e.g., into 720p) (955) and sent to party A (960) where it is decoded and displayed on party A's device (965) resulting in an image that appears "zoomed-in" on the designated region. It is specifically noted that the resolutions described here are for illustrative purposes only. As long as the image whose region is designated is captured at a higher resolution than that transmitted between the parties during normal A/V operations, the resulting displayed image on party A's device will appear blown-up or zoomed-in (regardless of whether the image was captured by a forward- or rear-facing camera). In another embodiment, party A designates a tracking region so that the images sent back from party B's electronic device follows or tracks the designated area. In this embodiment, a stream of blown-up or zoomed-in images would be transmitted from party B's electronic device to party A's electronic device. By way of example, party A could designate a region with a double-tap. This information, when received by party B's electronic device, could cause whatever object is in the designated region (e.g., a person) to be tracked from frame-to-frame.

Figure 10:
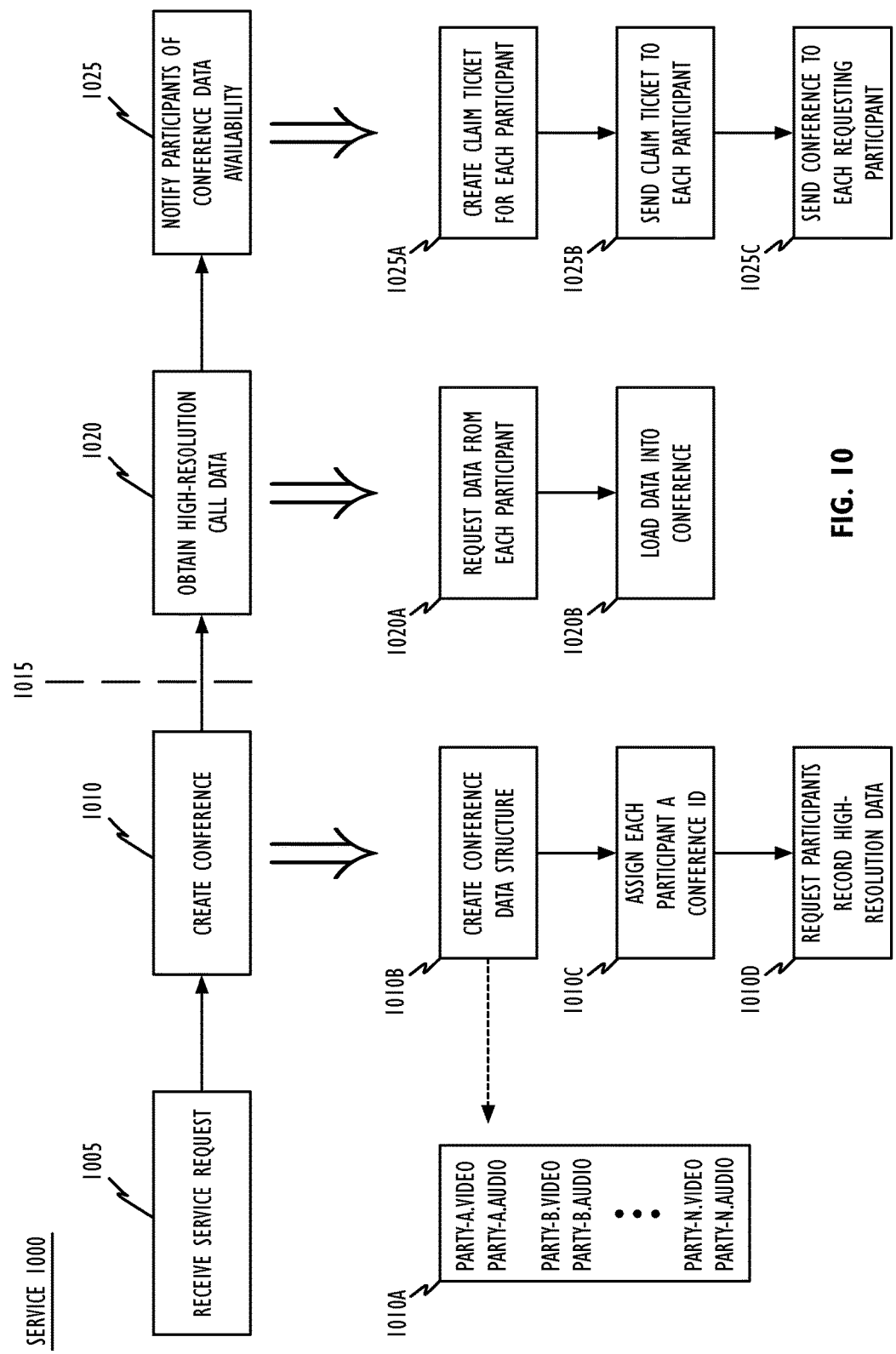
FIG. 10 shows a web-, cloud- or network-based conference operation in accordance with one or more embodiments.

Referring to FIG. 10, a web-, cloud- or network-based service 1000 in accordance with one or more embodiments is used to provide high-resolution video and audio to all call participants. As illustrated, service 1000 receives a request to setup or create a high-resolution conference (block 1005). As part of the request, each participant is identified (e.g., via their telephone number or other unique identifier). In response, service 1000 creates the conference (block 1010). In one embodiment, conference creation includes creating conference data structure 1010A (block 1010B), assigning each participant a conference identifier (block 1010C), and requesting each participant record high-resolution video and audio of their portion of the call (block 1010D). In another embodiment, participants are configured to automatically record their portion of a conference call in high-resolution. In implementations such as this, service 1000 need not issue a request in accordance with block 1010D. In still other embodiments, some participants automatically record their high-resolution streams while others in the same conference call require a request in accordance with block 1010D. As shown, conference data structure 1010A can include entries for each participant's corresponding video and audio; with the conference identifier allowing service 1000 to map individual participants with their corresponding data entries. In other embodiments, the "conference" is a series of database entries rather than a single structure. In one embodiment, conference creation in accordance with block 1010 occurs before the conference call is begun. In another embodiment, service 1000 is initiated after a call has already started. In this latter case, if one or more participants has not recorded (i.e., stored) high-resolution data of their portion of the call prior to service 1000 being initiated, high-resolution data for that participant's portion of the conference (i.e., before conference initiation) will not be available later. After the last two participants to the conference call have terminated their connection (action 1015), service 1000 obtains each participant's high resolution call data (block 1020).

In one embodiment, data acquisition in accordance with block 1020 includes requesting high-resolution data from each participant (block 1020A) and, once acquired, loading that data into conference structure 1010A (block 1020B). Once all of the conference's high-resolution data has been obtained (or as much of it as possible), service 1000 notifies each participant that the data is available (block 1025). In one embodiment, notification in accordance with block 1025 includes creating a "claim ticket" (block 1025A), sending the tickets to each participant (block 1025B), and downloading conference data to those participants requesting the same (block 1025C). The idea behind the claim ticket is that a participant may not be immediately able to download conference 1010A fully-populated with high-resolution data. By way of example, one participant may be configured to only download large amounts of data (or data from service 1000) over Wi-Fi and, at present, Wi-Fi communication is unavailable. (WI-FI is a registered trademark of the Wi-Fi Alliance Corporation.) Similarly, a participant may not be able to upload high-resolution data to service 1000 as soon as requested (e.g., in immediate response to operations in accordance with block 1020A). As such, a complete high-resolution conference may not be assembled until sometime after call termination (action 1015). In some embodiments, one or more participants are not able to provide high-resolution data (as compared to other conference participants). In such cases conference 1010A is marked as complete when the "best" (highest resolution) data is received for each participant. For example, some participants may be configured to only provide low-resolution video and audio to service 1000. In such cases, if a participant notifies service 1000 of this in response, for example, to request 1010D, any participant may provide the low-resolution participant's data. In one or more other embodiments conference data (e.g., video and audio signals) passes through service 1000—e.g., during internet conferencing. In such cases, operation 1000 is able to obtain high-resolution data from each participant in real-time as the call takes place.

As used here, the term "party" is meant to refer to an individual or person while the term "participant" is meant to refer an electronic device used by a party to participate in a conference call. Thus, as part of operations in accordance with block 1010 the phrase "request participants record high-resolution data" means that service 1000 sends a request to each party's electronic device (e.g., smart phone) to record high-resolution video and audio of their respective portions of the conference call. It is further noted that, in practice, conference data (e.g., video and audio) also includes synchronization information that can be used by a subsequent "player" application. In accordance with this disclosure, conference 1010A represents a single entity (e.g., file or container) that has multiple entries—two for each participant (plus a third if metadata concerning the participant is also captured). One result of this arrangement is that all of a conference's data may be manipulated, moved and copied as a single element. In addition, a player application designed to work with and/or display conference 1010 may do so in any convenient manner. For example, participants could be shown horizontally across a display with some visible indicator provided to indicate who is currently talking. Significantly, because each participant's data is separate from the others a player application may obtain, manipulate and display the data in any manner desired. This approach permits a party to view their conference in any manner they choose; using data they had heretofore never had access to.

Figure 11:
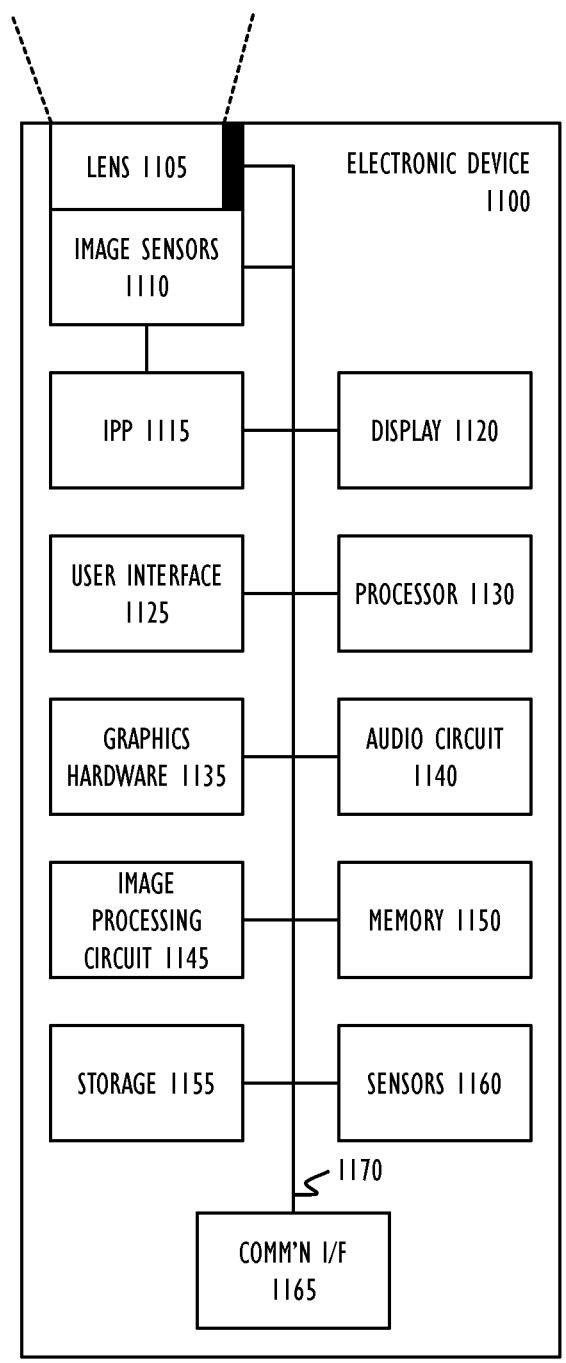
FIG. 11 shows, in block diagram form, an electronic device in accordance with one or more embodiments.

Referring to FIG. 11, a simplified functional block diagram of illustrative electronic device 1100 is shown according to one or more embodiments. Electronic device 1100 is used to acquire, generate and display digital images (including video sequences) in accordance with this disclosure. As noted above, an illustrative electronic device 1100 could be a mobile telephone (aka, a smart phone), a personal media device or a notebook computer system. As shown, electronic device 1100 includes lens assemblies 1105 and image sensors 1110 for capturing images of a scene. By way of example, lens assembly 1105 includes a first assembly configured to capture images in a direction away from the device's display 1120 (e.g., a rear-facing lens assembly) and a second lens assembly configured to capture images in a direction toward or congruent with the device's display 1120 (e.g., a front facing lens assembly). In one embodiment, each lens assembly has its own sensor (e.g., element 1110). In another embodiment, each lens assembly shares a common sensor. In addition, electronic device 1100 includes image processing pipeline (IPP) 1115, display element 1120, user interface 1125, processor(s) 1130, graphics hardware 1135, audio circuit 1140, image processing circuit 1145, memory 1150, storage 1155, sensors 1160, communication interface 1165, and communication network or fabric 1170.

Lens assembly 1105 includes a single lens or multiple lens, filters, and a physical housing unit (e.g., a barrel). One function of lens assembly 1105 is to focus light from a scene onto image sensor 1110. Image sensor 1110 may, for example, be a CCD (charge-coupled device) or CMOS (complementary metal-oxide semiconductor) imager. IPP 1115 processes image sensor output (e.g., RAW image data from sensor 1110) to yield a HDR image, image sequence or video sequence. More specifically, IPP 1115 performs a number of different tasks including, but not be limited to, black level removal, de-noising, lens shading correction, white balance adjustment, demosaic operations, and the application of local or global tone curves or maps. IPP 1115 comprises a custom designed integrated circuit, a programmable gate-array, a central processing unit (CPU), a graphical processing unit (GPU), memory, or a combination of these elements (including more than one of any given element). Some functions provided by IPP 1115 is implemented at least in part via software (including firmware). Display element 1120 is used to display text and graphic output as well as receiving user input via user interface 1125. For example, display element 1120 may be a touch-sensitive display screen. User interface 1125 can also take a variety of other forms such as a button, keypad, dial, a click wheel, and keyboard. Processor 1130 is a system-on-chip (SOC) such as those found in mobile devices and include one or more dedicated CPUs and one or more GPUs. Processor 1130 is based on reduced instruction-set computer (RISC) or complex instruction-set computer (CISC) architectures or any other suitable architecture and each computing unit includes one or more processing cores. Graphics hardware 1135 is a special purpose computational hardware for processing graphics and/or assisting processor 1130 perform computational tasks. In one embodiment, graphics hardware 1135 includes one or more programmable GPUs each of which has one or more cores. Audio circuit 1140 includes one or more microphones, one or more speakers and one or more audio codecs. Image processing circuit 1145 aids in the capture of still and video images from image sensor 1110 and include at least one video codec. Image processing circuit 1145 works in concert with IPP 1115, processor 1130 and/or graphics hardware 1135. Images, once captured, are stored in memory 1150 and/or storage 1155. Memory 1150 includes one or more different types of media used by IPP 1115, processor 1130, graphics hardware 1135, audio circuit 1140, and image processing circuitry 1145 to perform device functions. For example, memory 1150 includes memory cache, read-only memory (ROM), and/or random access memory (RAM). Storage 1155 stores media (e.g., audio, image and video files), computer program instructions or software, preference information, device profile information, and any other suitable data. Storage 1155 includes one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 1160 include, but need not be limited to, one or more of an optical activity sensor, an optical sensor array, an accelerometer, a sound sensor, a barometric sensor, a proximity sensor, an ambient light sensor, a vibration sensor, a gyroscopic sensor, a compass, a magnetometer, a thermistor sensor, an electrostatic sensor, a temperature sensor, and an opacity sensor. Communication interface 1165 is used to connect device 1100 to one or more networks. Illustrative networks include, but are not limited to, a local network such as a universal serial bus (USB) network, an organization's local area network, and a wide area network such as the Internet. Communication interface 1165 uses any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 1170 comprises one or more continuous (as shown) or discontinuous communication links and is formed as a bus network, a communication network, or a fabric comprised of one or more switching devices (e.g., a cross-bar switch).

EXAMPLES

The following examples pertain to further embodiments.

Example 1 is a non-transitory program storage device comprising instructions stored thereon to cause one or more processors to: capture, at a first electronic device as part of a video conference with a second electronic device, a first temporal sequence of images, wherein the first temporal sequence of images has a first resolution and includes a first image having a first identifier; store the first temporal sequence of images into a memory of the first device; convert each of the first temporal sequence of images to a second resolution, wherein the second resolution is less than the first resolution; transmit each of the converted images of the first temporal sequence of images to the second device; receive, from the second device and during the video conference, a request for the first image; identify, in response to the request, the first image from the memory based on the first identifier; and transmit, in response to the identification, the first image having the first resolution to the second device.

Example 2 comprises the subject matter of Example 1, wherein the instructions to transmit the first image having the first resolution to the second device comprise instructions to cause the one or more processors to transmit the first image to the second device through a communication modality other than the video conference.

Example 3 comprises the subject matter of Example 2, wherein the instructions to transmit the first image having the first resolution to the second device through a communication modality other than the video conference are executed after the video conference ends.

Example 4 comprises the subject matter of Example 3, wherein the instructions to transmit the first image having the first resolution to the second device comprise instructions to cause the one or more processors to: transmit the first image having the first resolution to a network-based storage system; and automatically transmit a message from the first device to the second device indicating the first image is stored at the network-based storage system.

Example 5 comprises the subject matter of Example 4, wherein the message comprises an email message.

Example 6 comprises the subject matter of Example 2, wherein the communication modality comprises an email communication modality.

Example 7 comprises the subject matter of Example 1, wherein the instructions to receive a request comprise instructions to cause the one or more processors to receive a request for a copy of the first temporal sequence of images beginning at the first image.

Example 8 comprises the subject matter of Example 7, wherein the instructions to transmit the first image having the first resolution to the second device comprise instructions to cause the one or more processors to: transmit a portion of the first temporal sequence of images beginning at the first image to a network-based storage system; and transmit a message from the first device to the second device indicating the portion of the first temporal sequence of images beginning at the first image is stored at the network-based storage system.

Example 9 comprises the subject matter of Example 7, wherein the non-transitory program storage device further comprises instructions to cause the one or more processors to: receive, from the second device and during the video conference, a stop request, the stop request corresponding to a second image from the first temporal sequence of images, the second image having a second identifier, the second image occurring after the first image in the first temporal sequence of images; identify, in response to the stop request, the second image from the memory; and transmit, in response to identification of the second image, a second temporal sequence of images comprising the first image, the second image, and one or more images from the first temporal sequence of images between the first and second images.

Example 10 comprises the subject matter of Example 9, wherein the stop request comprises an end of video conference indication.

Example 11 comprises the subject matter of Example 9, wherein the second temporal sequence of images includes every image from the first temporal sequence of images between the first and second images.

Example 12 comprises the subject matter of Example 11, wherein the instructions to transmit the second temporal sequence of images comprise instructions to cause the one or more processors to: transmit the second temporal sequence of images to a network-based storage system; and automatically transmit a message from the first device to the second device indicating the second temporal sequence of images is stored at the network-based storage system.

Example 13 comprises the subject matter of Example 12, wherein the message comprises a text message.

Example 14 is an electronic device, comprising: an image capture element; a display element; memory communicatively coupled to the image capture and display elements; and one or more processors communicatively coupled to the image capture and display elements and the memory, the one or more processors configured to execute program instructions stored in the memory to cause the electronic device to: establish a video conference communication link with a second electronic device; capture, after establishment of the video conference communication link with the second electronic device and using the image capture element, a first temporal sequence of images, wherein the first temporal sequence of images has a first resolution and includes a first image having a first identifier; store the first temporal sequence of images into the memory; transmit a converted version of the stored first temporal sequence of images to the second electronic device, the converted version of the first temporal sequence of images having a second resolution that is lower than the first resolution; receive, from the second electronic device and during the video conference, a request for the first image; identify, in response to the request, the first image from the memory based on the first identifier; and transmit the identified first image having the first resolution to the second electronic device.

Example 15 comprises the subject matter of Example 14, wherein the program instructions to cause the electronic device to transmit the first image having the first resolution to the second electronic device comprise instructions to cause the electronic device to transmit the first image to the second electronic device through a communication modality other than the video conference.

Example 16 comprises the subject matter of Example 15, wherein the program instructions to cause the electronic device to transmit the first image having the first resolution to the second electronic device through a communication modality other than the video conference occurs after the video conference ends.

Example 17 comprises the subject matter of Example 16, wherein the program instructions to cause the electronic device to transmit the first image having the first resolution to the second electronic device comprise instructions to cause the electronic device to: transmit the first image having the first resolution to a network-based storage system; and automatically transmit a message from the electronic device to the second electronic device indicating the first image is stored at the network-based storage system.

Example 18 comprises the subject matter of Example 16, wherein the program instructions to cause the electronic device to receive a request comprise program instructions to cause the electronic device to receive a request from the second electronic device for a copy of the first temporal sequence of images beginning at the first image.

Example 19 comprises the subject matter of Example 18, wherein the program instructions to cause the electronic device to transmit the first image having the first resolution to the second electronic device comprise instructions to cause the electronic device to: transmit a portion of the first temporal sequence of images beginning at the first image to a network-based storage system; and transmit a message from to the second electronic device indicating the portion of the first temporal sequence of images beginning at the first image is stored at the network-based storage system.

Example 20 is a method to capture high-resolution images during a video conference, comprising: capturing, at a first device as part of a video conference with a second device, a first temporal sequence of images, wherein the first temporal sequence of images has a first resolution and includes a first image having a first identifier; storing, concomitantly with the capturing, the first temporal sequence of images into a memory of the first device; transmitting, concomitantly with the storing, a converted version of the first temporal sequence of images to the second device, the converted version of the first temporal sequence of images having a second resolution that is lower than the first resolution; receiving, from the second device and during the video conference, a request for the first image; identifying, in response to the request, the first image from the memory based on the first identifier; and transmitting, in response to the identifying, the first image having the first resolution to the second device.

Example 21 comprises the subject matter of Example 20, wherein transmitting the first image having the first resolution to the second device comprises transmitting the first image to the second device through a communication modality other than the video conference.

Example 22 comprises the subject matter of Example 21, wherein transmitting the first image having the first resolution to the second device through a communication modality other than the video conference occurs after the video conference ends.

Example 23 comprises the subject matter of Example 22, wherein transmitting the first image having the first resolution to the second device comprises: transmitting the first image having the first resolution to a network-based storage system; and automatically transmitting a message from the first device to the second device indicating the first image is stored at the network-based storage system.

Example 24 comprises the subject matter of Example 23, wherein the message comprises an email message.

Example 25 comprises the subject matter of Example 21, wherein the communication modality comprises an email communication modality.

Example 26 comprises the subject matter of Example 20, wherein receiving a request comprises receiving a request for a copy of the first temporal sequence of images beginning at the first image.

Example 27 comprises the subject matter of Example 26, wherein transmitting the first image having the first resolution to the second device comprises: transmitting a portion of the first temporal sequence of images beginning at the first image to a network-based storage system; and transmitting a message from the first device to the second device indicating the portion of the first temporal sequence of images beginning at the first image is stored at the network-based storage system.

Example 28 comprises the subject matter of Example 26, wherein the method further comprises: receiving, from the second device and during the video conference, a stop request, the stop request corresponding to a second image from the first temporal sequence of images, the second image having a second identifier, the second image occurring after the first image in the first temporal sequence of images; identifying, in response to the stop request, the second image from the memory; and transmitting, in response to identifying the second image, a second temporal sequence of images comprising the first image, the second image, and one or more images from the first temporal sequence of images between the first and second images.

Example 29 comprises the subject matter of Example 28, wherein the stop request comprises an end of video conference indication.

Example 30 comprises the subject matter of Example 28, wherein the second temporal sequence of images includes every image from the first temporal sequence of images between the first and second images.

Example 31 comprises the subject matter of Example 30, wherein transmitting the second temporal sequence of images comprises: transmitting the second temporal sequence of images to a network-based storage system; and automatically transmitting a message from the first device to the second device indicating the second temporal sequence of images is stored at the network-based storage system.

Example 32 comprises the subject matter of Example 31, wherein the message comprises a text message.

Example 33 is an audio/visual conferencing method, comprising: receiving, at a first electronic device, a first image from a second electronic device, the first image having a first resolution, wherein the first and second electronic devices are communicatively coupled in an audio/visual conference; designating, at the first electronic device, a first region of the first image, the first region comprising less than all of the first image; sending, by the first electronic device, information identifying the first region to the second electronic device; receiving, at the first electronic device and in response to the sending, a second image, the second image having the first resolution, the second image corresponding only to the first region; and displaying, at the first electronic device, the second image.

Example 34 comprises the subject matter of Example 33, wherein the first resolution comprises a resolution used when transmitting images between the first and second electronic devices.

Example 35 comprises the subject matter of Example 33, wherein designating comprising obtaining input through a touch-sensitive display element.

Example 36 is a non-transitory program storage device comprising instructions stored thereon to cause one or more processors to: receive, at a first electronic device, a first image from a second electronic device, the first image having a first resolution, wherein the first and second electronic devices are communicatively coupled in an audio/visual conference; designate, at the first electronic device, a first region of the first image, the first region comprising less than all of the first image; send, by the first electronic device, information identifying the first region to the second electronic device; receive, at the first electronic device and in response to the information identifying the first region sent to the second electronic device, a second image having the first resolution, the second image corresponding only to the first region; and display, at the first electronic device, the second image.

Example 37 comprises the subject matter of Example 36, wherein the first resolution comprises a resolution used when images are transmitted between the first and second electronic devices.

Example 38 comprises the subject matter of Example 36, wherein the instructions to designate comprise instructions to obtain input through a touch-sensitive display element.

Example 39 is an electronic device, comprising: a memory; an image capture unit communicatively coupled to the memory; a display element communicatively coupled to the memory; and one or more processors communicatively coupled to the memory, the image capture unit and the display element, the one or more processors configured to execute program instructions stored in the memory to cause the electronic device to: receive, at the electronic device, a first image from a second electronic device, the first image having a first resolution, wherein the electronic devices are communicatively coupled in an audio/visual conference; designate, at the electronic device, a first region of the first image, the first region comprising less than all of the first image; send, by the electronic device, information identifying the first region to the second electronic device; receive, at the electronic device and in response to the information identifying the first region sent to the second electronic device, a second image having the first resolution, the second image corresponding only to the first region; and display, on the display element, the second image.

Example 40 comprises the subject matter of Example 39, wherein the first resolution comprises a resolution used when images are transmitted between the electronic devices.

Example 41 comprises the subject matter of Example 39, wherein: the display element comprises a touch-sensitive display element; and the instructions to cause the electronic device to designate comprise instructions to cause the electronic device to obtain input through the touch-sensitive display element.

Example 42 is an audio/visual conferencing method, comprising: capturing, at a first electronic device, a first image, the first image having a first resolution; converting, by the first electronic device, the first image to a second image, the second image having a second resolution wherein the second resolution is lower than the first resolution; transmitting, by the first electronic device, the second image to a second electronic device wherein the electronic devices are communicatively coupled in an audio/visual conference; receiving, by the first electronic device from the second electronic device and in response to the transmitting, information that identifies a region of the second image wherein the region comprises less than all of the second image; generating, by the first electronic device, a third image comprising that portion of the first image corresponding to the region, the third image having the second resolution; and sending, by the first electronic device, the third image to the second electronic device.

Example 43 comprises the subject matter of Example 42, wherein the second resolution comprises a resolution used when transmitting images between the first and second electronic devices.

Example 44 comprises the subject matter of Example 42, wherein capturing a first image comprises capturing a first image at a resolution greater than 720p.

Example 45 is a non-transitory program storage device comprising instructions stored thereon to cause one or more processors to: capture, at a first electronic device, a first image, the first image having a first resolution; convert, by the first electronic device, the first image to a second image, the second image having a second resolution wherein the second resolution is lower than the first resolution; transmit, by the first electronic device, the second image to a second electronic device wherein the electronic devices are communicatively coupled in an audio/visual conference; receive, by the first electronic device from the second electronic device and in response to having transmitted the second image to the second electronic device, information that identifies a region of the second image wherein the region comprises less than all of the second image; generate, by the first electronic device, a third image comprising that portion of the first image corresponding to the region, the third image having the second resolution; and send, by the first electronic device, the third image to the second electronic device.

Example 46 comprises the subject matter of Example 45, wherein the second resolution comprises a resolution used when transmitting images between the electronic devices.

Example 47 comprises the subject matter of Example 45, wherein the instructions to capture a first image comprise instructions to capture a first image at a resolution greater than 720p.

Example 48 is an electronic device, comprising: a memory; an image capture unit communicatively coupled to the memory; a display element communicatively coupled to the memory; and one or more processors communicatively coupled to the memory, the image capture unit and the display element, the one or more processors configured to execute program instructions stored in the memory to cause the electronic device to: capture, at the electronic device, a first image using the image capture unit, the first image having a first resolution; convert, by the electronic device, the first image to a second image, the second image having a second resolution wherein the second resolution is lower than the first resolution; transmit, by the electronic device, the second image to a second electronic device wherein the electronic devices are communicatively coupled in an audio/visual conference; receive, by the electronic device from the second electronic device and in response to having transmitted the second image to the second electronic device, information that identifies a region of the second image wherein the region comprises less than all of the second image; generate, by the electronic device, a third image comprising that portion of the first image corresponding to the region, the third image having the second resolution; and send, by the electronic device, the third image to the second electronic device.

Example 49 comprises the subject matter of Example 48, wherein the second resolution comprises a resolution used when transmitting images between the electronic devices.

Example 50 comprises the subject matter of Example 48, wherein the instructions to capture a first image comprise instructions to capture a first image at a resolution greater than 720p.

Example 51 is a non-transitory program storage device comprising instructions stored thereon to cause one or more processors to: receive, from a first of a plurality of electronic devices, a first request to form a conference call; generate, in response to the first request, a conference data structure; send, based on a determination the conference call has ended, a second request to each of the plurality of electronic devices to return a high-resolution video stream generated by each electronic device during the conference call; receive, in response to the second requests, a high-resolution video stream from at least some of the plurality of electronic devices; store each of the received high-resolution video streams in the conference data structure to generate a completed conference data structure; and send, to each of the plurality of electronic devices, a notice that the completed conference data structure is available.

Example 52 comprises the subject matter of Example 51, wherein the instructions further cause the one or more processors to send, in response to the first request, a third request to one or more of the plurality of electronic devices to record a high-resolution video stream during the conference call.

Example 53 comprises the subject matter of Example 52, wherein the second and third requests comprise a single request.

Example 54 comprises the subject matter of Example 52, wherein the third request comprises a request to record a high-resolution video stream and a high-resolution audio stream during the conference call.

Example 55 comprises the subject matter of Example 51, wherein the instructions to send a second request further comprise instructions to cause the one or more processors to request, from each of the plurality of electronic devices, a high-resolution audio stream generated by each electronic device during the conference call.

Example 56 comprises the subject matter of Example 55, wherein the instructions to store further comprise instructions to cause the one or more processors to store the high-resolution audio stream from each of the plurality of electronic devices in the conference data structure, wherein each video stream is separate from all other video and audio streams and each audio stream is separate from all other video and audio streams.

Example 57 comprises the subject matter of Example 51, wherein the instructions further cause the one or more processors to: receive, in response to the notice, a third request from a second electronic device of the plurality of electronic devices; and send, in response to the third request, the completed conference data structure to the second electronic device.

Example 58 comprises the subject matter of Example 57, wherein the instructions to send the completed conference data structure comprise instructions to cause the one or more processors to permit the second electronic device to download the completed conference data structure.

Example 59 is a system, comprising: a memory; an image capture unit communicatively coupled to the memory; a display element communicatively coupled to the memory; a communication interface communicatively coupled to the memory; and one or more processors operatively coupled to the memory, the image capture unit and the display element, the one or more processors configured to execute program instructions stored in the memory to cause the system to: receive, through the communication interface, a first request to form a conference call from a first of a plurality of electronic devices; generate, in response to the first request, a conference data structure in the memory; send, through the communication interface, a second request to each of the plurality of electronic devices to return a high-resolution video stream generated by each electronic device during the conference call based on a determination the conference call has ended; receive, through the communication interface, a high-resolution video stream from at least some of the plurality of electronic devices in response to the second requests; store each of the received high-resolution video streams in the conference data structure to generate a completed conference data structure; and send, through the communication interface, a notice that the completed conference data structure is available to each of the plurality of electronic devices.

Example 60 comprises the subject matter of Example 59, wherein the instructions further cause the system to send, through the communication interface and in response to the first request, a third request to one or more of the plurality of electronic devices to record a high-resolution video stream during the conference call.

Example 61 comprises the subject matter of Example 60, wherein the second and third requests comprise a single request.

Example 62 comprises the subject matter of Example 60, wherein the third request comprises a request to record a high-resolution video stream and a high-resolution audio stream during the conference call.

Example 63 comprises the subject matter of Example 59, wherein the instructions to send a second request further comprise instructions to cause the system to request, from each of the plurality of electronic devices through the communication interface, a high-resolution audio stream generated by each electronic device during the conference call.

Example 64 comprises the subject matter of Example 63, wherein the instructions to store further comprise instructions to cause the system to store the high-resolution audio stream from each of the plurality of electronic devices in the conference data structure, wherein each video stream is separate from all other video and audio streams and each audio stream is separate from all other video and audio streams.

Example 65 comprises the subject matter of Example 59, wherein the instructions further cause the one or more processors to: receive, through the communication interface, a third request from a second electronic device of the plurality of electronic devices in response to the notice; and send, through the communication interface, the completed conference data structure to the second electronic device in response to the third request.

Example 66 comprises the subject matter of Example 59, wherein the instructions to send the completed conference data structure comprise instructions to cause the one or more processors to permit a second electronic device of the plurality of electronic devices to download the completed conference data structure.

Example 67 is an audio/visual conferencing method, comprising: receiving, from a first of a plurality of electronic devices, a first request to form a conference call; generating, in response to the first request, a conference data structure in a memory; sending, based on determining the conference call has ended, a second request to each of the plurality of electronic devices to return a high-resolution video stream generated by each electronic device during the conference call; receiving, in response to the second requests, a high-resolution video stream from at least some of the plurality of electronic devices; storing each of the received high-resolution video streams in the conference data structure in the memory to generate a completed conference data structure; and sending, to each of the plurality of electronic devices, a notice that the completed conference data structure is available.

Example 68 comprises the subject matter of Example 67, wherein the method further comprises sending, in response to the first request, a third request to one or more of the plurality of electronic devices to record a high-resolution video stream during the conference call.

Example 69 comprises the subject matter of Example 68, wherein the second and third requests comprise a single request.

Example 70 comprises the subject matter of Example 68, wherein the third request comprises a request to record a high-resolution video stream and a high-resolution audio stream during the conference call.

Example 71 comprises the subject matter of Example 67, wherein sending a second request further comprises requesting, from each of the plurality of electronic devices, a high-resolution audio stream generated by each electronic device during the conference call.

Example 72 comprises the subject matter of Example 71, wherein storing further comprises storing the high-resolution audio stream from each of the plurality of electronic devices in the conference data structure, wherein each video stream is separate from all other video and audio streams and each audio stream is separate from all other video and audio streams.

Example 73 comprises the subject matter of Example 67, wherein the method further comprises: receiving, in response to the notice, a third request from a second electronic device of the plurality of electronic devices; and sending, in response to the third request, the completed conference data structure to the second electronic device.

Example 74 comprises the subject matter of Example 67, wherein sending the completed conference data structure comprises permitting a second electronic device of the plurality of devices to download the completed conference data structure.

Example 75 is a non-transitory program storage device comprising instructions stored thereon to cause one or more processors of a first electronic device to: send, to a network-based service, a first request to form a conference call; receive, in response to the first request, a confirmation that a conference has been created from a network-based service; begin, after the confirmation is received, a conference call with one or more other electronic devices; generate, during the conference call, a first high-resolution video stream; send, at completion of the conference call, the high-resolution video stream to the network-based service; and receive, after the high-resolution video stream has been sent, a notice from the network-based service that a completed conference entity is available.

Example 76 comprises the subject matter of Example 75, wherein the instructions to generate are executed by the first electronic device's one or more processors automatically after the confirmation is received.

Example 77 comprises the subject matter of Example 75, wherein the instructions to generate are executed by the first electronic device's one or more processors only after a request to do so has been received by the first electronic device from the network-based service.

Example 78 comprises the subject matter of Example 75, wherein the instructions to generate further comprise instructions to cause the first electronic device's one or more processors to generate an audio stream.

Example 79 comprises the subject matter of Example 78, wherein the instructions to send the high-resolution video stream further comprise instructions to cause the first electronic device's one or more processors to send the audio stream to the network-based service.

Example 80 comprises the subject matter of Example 75, further comprising instructions to cause the first electronic device's one or more processors to obtain, in response to the notice, the completed conference entity from the network-based service, wherein the completed conference entity includes a high-resolution video stream for at least one of the other electronic devices.

Example 81 is an electronic device, comprising: a memory; an image capture unit communicatively coupled to the memory; a display element communicatively coupled to the memory; a communication interface communicatively coupled to the memory; and one or more processors operatively coupled to the memory, the image capture unit and the display element, the one or more processors configured to execute program instructions stored in the memory to cause the electronic device to: send, through the communication interface, a first request to form a conference call to a network-based service; receive, through the communication interface, a confirmation that a conference has been created from a network-based service in response to the first request; begin, after the confirmation is received, a conference call with one or more other electronic devices; capture, by the image capture unit, a first high-resolution video stream; store the captured high-resolution video stream in the memory; send, through the communication interface, the high-resolution video stream to the network-based service at completion of the conference call; and receive, through the communication interface, a notice from the network-based service that a completed conference entity is available after the high-resolution video stream has been sent.

Example 82 comprises the subject matter of Example 81, wherein the instructions to generate are executed by the electronic device's one or more processors automatically after the confirmation is received.

Example 83 comprises the subject matter of Example 81, wherein the instructions to generate are executed by the electronic device's one or more processors only after a request to do so has been received by the electronic device from the network-based service.

Example 84 comprises the subject matter of Example 81, wherein the instructions to generate further comprise instructions to cause the electronic device's one or more processors to generate an audio stream.

Example 85 comprises the subject matter of Example 84, wherein the instructions to send the high-resolution video stream further comprise instructions to cause the electronic device's one or more processors to send the audio stream to the network-based service.

Example 86 comprises the subject matter of Example 81, further comprising instructions to cause the electronic device's one or more processors to obtain, in response to the notice, the completed conference entity from the network-based service, wherein the completed conference entity includes a high-resolution video stream for at least one of the other electronic devices.

Example 87 is an audio/visual conferencing method, comprising: sending, to a network-based service, a first request to form a conference call; receiving, in response to the first request, a confirmation that a conference has been created from a network-based service; beginning, after the confirmation is received, a conference call with one or more other electronic devices; generating, during the conference call, a first high-resolution video stream; sending, at completion of the conference call, the high-resolution video stream to the network-based service; and receiving, after the high-resolution video stream has been sent, a notice from the network-based service that a completed conference entity is available.

Example 88 comprises the subject matter of Example 87, wherein generating comprises automatically generating after the confirmation is received.

Example 89 comprises the subject matter of Example 87, wherein generating comprises generating only after a request to do so has been received from the network-based service.

Example 90 comprises the subject matter of Example 87, wherein generating further comprises generating an audio stream.

Example 91 comprises the subject matter of Example 90, wherein sending the high-resolution video stream further comprises sending the audio stream to the network-based service.

Example 92 comprises the subject matter of Example 87, wherein the method further comprises obtaining, in response to the notice, the completed conference entity from the network-based service, wherein the completed conference entity includes a high-resolution video stream for at least one of the other electronic devices.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). By way of example, a video conference in accordance with this disclosure may include more than two (2) participants. In such a case, each device may capture a high-resolution image (or video) when notified that such is desired (e.g., all of the devices except the device sourcing the request). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device comprising instructions stored thereon to cause one or more processors to:

receive, from a first of a plurality of electronic devices, a first request to form a conference call;

generate, in response to the first request, a conference data structure;

transmit, based on a determination the conference call has ended, a second request to each of the plurality of electronic devices to return a high-resolution video stream generated by each electronic device during the conference call;

receive, in response to the second requests, the high-resolution video stream from at least some of the plurality of electronic devices;

store each of the received high-resolution video streams in the conference data structure to generate a completed conference data structure; and transmit, to each of the plurality of electronic devices, a notice that the completed conference data structure is available.

2. The non-transitory program storage device of claim 1, further comprising instructions to cause the one or more processors to transmit, in response to the first request, a third request to one or more of the plurality of electronic devices to record the high-resolution video stream during the conference call.

3. The non-transitory program storage device of claim 2, wherein the second and third requests comprise a single request.

4. The non-transitory program storage device of claim 2, wherein the third request comprises a request to record the high-resolution video stream and a high-resolution audio stream during the conference call.

5. The non-transitory program storage device of claim 1, wherein the instructions to cause the one or more processors to transmit a second request further comprise instructions to cause the one or more processors to request, from each of the plurality of electronic devices, a high-resolution audio stream generated by each electronic device during the conference call.

6. The non-transitory program storage device of claim 5, wherein the instructions to cause the one or more processors to store further comprise instructions to cause the one or more processors to store the high-resolution audio stream from each of the plurality of electronic devices in the conference data structure, wherein each video stream is separate from all other video and audio streams and each audio stream is separate from all other video and audio streams.

7. The non-transitory program storage device of claim 1, further comprising instructions to cause the one or more processors to:

receive, in response to the notice, a third request from a second electronic device of the plurality of electronic devices; and transmit, in response to the third request, the completed conference data structure to the second electronic device.

8. The non-transitory program storage device of claim 7, wherein the instructions to cause the one or more processors to transmit the completed conference data structure comprise instructions to cause the one or more processors to permit the second electronic device to download the completed conference data structure.

9. A system comprising:

a memory;

a communication interface communicatively coupled to the memory; and one or more processors operatively coupled to the memory, the one or more processors configured to execute program instructions stored in the memory to cause the one or more processors to:
- receive, through the communication interface, a first request to form a conference call from a first of a plurality of electronic devices;
- generate, in response to the first request, a conference data structure in the memory;
- transmit, through the communication interface and in response to the first request, a second request to one or more of the plurality of electronic devices to record a high-resolution video stream during the conference call;
- transmit, through the communication interface, a third request to each of the plurality of electronic devices to return the high-resolution video stream generated by each electronic device during the conference call based on a determination the conference call has ended;
- receive, through the communication interface, the high-resolution video stream from at least some of the plurality of electronic devices in response to the third requests;
- store each of the received high-resolution video streams in the conference data structure to generate a completed conference data structure; and
- transmit, through the communication interface, a notice that the completed conference data structure is available to each of the plurality of electronic devices.

10. The system of claim 9, wherein the second and third requests comprise a single request.

11. The system of claim 9, wherein the second request comprises a request to record the high-resolution video stream and a high-resolution audio stream during the conference call.

12. The system of claim 9, wherein the program instructions to transmit a third request further comprise program instructions to cause the one or more processors to return, from each of the plurality of electronic devices through the communication interface, a high-resolution audio stream generated by each electronic device during the conference call.

13. The system of claim 12, wherein the program instructions to store further comprise program instructions to cause the one or more processors to store the high-resolution audio stream from each of the plurality of electronic devices in the conference data structure, wherein each video stream is separate from all other video and audio streams and each audio stream is separate from all other video and audio streams.

14. The system of claim 9, wherein the one or more processors are further configured to execute program instructions to cause the one or more processors to:
- receive, through the communication interface, a fourth request from a second electronic device of the plurality of electronic devices in response to the notice; and
- transmit, through the communication interface, the completed conference data structure to the second electronic device in response to the fourth request.

15. The system of claim 14, wherein the program instructions to transmit the completed conference data structure comprise program instructions to cause the one or more processors to permit the second electronic device to download the completed conference data structure.

16. An audio/visual conferencing method, comprising:
- receiving, from a first of a plurality of electronic devices, a first request to form a conference call;
- generating, in response to the first request, a conference data structure in a memory;
- transmitting, based on determining the conference call has ended, a second request to each of the plurality of electronic devices to return a high-resolution audio and video stream generated by each electronic device during the conference call;
- receiving, in response to the second requests, the high-resolution audio and video stream from at least some of the plurality of electronic devices;
- storing each of the received high-resolution audio and video streams in the conference data structure in the memory to generate a completed conference data structure; and
- transmitting, to each of the plurality of electronic devices, a notice that the completed conference data structure is available.

17. The audio/visual conferencing method of claim 16, further comprising transmitting, in response to the first request, a third request to one or more of the plurality of electronic devices to record the high-resolution audio and video stream during the conference call.

18. The audio/visual conferencing method of claim 17, wherein the second and third requests comprise a single request.

19. The audio/visual conferencing method of claim 16, further comprising:
- receiving a third request from a second electronic device of the plurality of electronic devices in response to the notice; and
- transmitting the completed conference data structure to the second electronic device in response to the third request.

20. The audio/visual conferencing method of claim 19, further comprising permitting the second electronic device to download the completed conference data structure.

* * * * *